Patented Oct. 26, 1943

2,332,666

UNITED STATES PATENT OFFICE 2,332,666

ACETYLATED SUGAR COMPOUND

Richard Pasternack, Islip, and Ellis Vincent Brown, Cold Spring Harbor, N. Y., assignors to Charles Pfizer & Company, Brooklyn, N. Y., a corporation of New Jersey No Drawing. Application January 7, 1942, Serial No. 425,898

6 Claims. (Cl. 260—211)

This invention relates to 1-N-tetraacetyl-d-ribitylamino-2-phenylazo-4,5-dimethylbenzene and process for producing the same.

A process for the preparation of unsubstituted sugar amines of dimethylbenzene was disclosed by P. Karrer in Helv. Chim. Acta 19: 264-9, 1936, and is described in his United States Patent No. 2,237,074. He subjected d-ribose to reductive condensation with 3,4-dimethylaniline. To the resulting 3,4-dimethylphenyl-d-ribamine he coupled phenyl diazonium sulfate in acid solution. His product was precipitated in crystalline form by partially neutralizing the solution with NaOH and could be recrystallized from alcohol. As indicated by Karrer's article, he used the product only as an intermediate in the preparation of 1-N-d-ribitylamino - 2 - amino-4,5-dimethylbenzene.

We have found that our tetraacetylated ribitylamino-phenylazodimethylbenzene is of especial value for the preparation of riboflavin. As is known in the art, it cannot be prepared by direct acetylation of a ribitylamine since the amino group is first attacked. Experimental tests indicate that the secondary alcohol group is next substituted. The three remaining hydroxyl groups of the sugar side chain take up the acetyl groups last and lose them first upon saponification. Thus by such a process a tetraacetylated compound having a free secondary amino group cannot be produced. Until recently no other method of preparing the tetraacetylated product has seemed possible, since no process has been known for preparing fully acetylated aldehydo ribose. Moreover, it could not be foretold whether diazonium compounds would couple with acetylated sugar amines in the desired position, since steric hindrance might either change the point of attachment of the diazonium group or prevent the coupling altogether.

However, in our United States Patent No. 2,237,263 we have disclosed the preparation of aldehydo tetraacetylated ribose, and in our later United States Patent No. 2,250,999, we have shown how such acetylated aldehydo sugars may be reductively condensed with aromatic amines to form acetylated N-aryl glucamines.

We have now found that such glucamines may be used to prepare the desired azo compound, since even in the presence of the four acetyl groups phenyl diazonium salts can be coupled with the benzene nucleus of the glucamine to form 1 - N-tetraacetyl-d-ribitylamino-2-phenylazo-4,5-dimethylbenzene. It is preferable to use predominantly non-aqueous solvents, and the medium should be only mildly acid. The product does not crystallize, but can be precipitated in amorphous form by pouring the solution into an excess of water. The yield is good and the purity high.

*Example 1.*—56 grams of aniline, 120 cc. of water, 120 cc. of concentrated hydrochloric acid, and 44 g. of sodium nitrite were allowed to react at 0° C. The diazonium solution thus formed was run into a solution of 200 g. of tetraacetyl-4,5-dimethylphenyl-d-ribamine in 1200 cc. of glacial acetic acid containing 160 g. of sodium acetate, previously cooled to 0° C. Stirring was continued for an hour, after which the mixture was poured into 12 liters of water. The amorphous product which precipitated out was extracted with 1500 cc. of chloroform. Evaporation of the chloroform from the extract left an orange-colored residue of 1-N-tetraacetyl-d-ribitylamino-2-phenylazo-4,5-dimethylbenzene, which has not yet been crystallized. The yield was 220 g. which corresponds to about 88% of theory.

For the purpose of identification a portion of the orange precipitate was deacetylated by warming in methyl alcohol solution containing a small amount of sodium methylate. The 1-N-ribitylamino-2-phenylazo-4,5-dimethylbenzene so prepared melted at 172° C. It showed no depression of melting point when mixed with an authentic sample of 1-N-d-ribitylamino-2-phenylazodimethylbenzene.

*Example 2.*—56 grams of aniline, 120 cc. of water, 120 cc. of concentrated hydrochloric acid, and 44 g. of sodium nitrate were allowed to react at 0° C. The diazonium solution thus formed was run into a solution of 200 g. of tetraacetyl-4,5-dimethylphenyl-d-ribamine in 1200 cc. of dioxan previously cooled to 0° C. Stirring was continued for an hour, after which an alcoholic solution of sodium hydroxide was added while continuing the agitation until the whole was neutral to litmus. After filtering from precipitated sodium chloride, the solution was evaporated to dryness under vacuum to recover the orange-colored, amorphous crude dye. The yield is of the same order as in Example 1.

While we have described the coupling involving phenyl diazonium chloride, our invention is not limited to the use of this particular diazonium salt, since other salts such as the sulfate and nitrate work equally well.

We claim:

1. As a new product, 1-N-tetraacetyl-d-ribitylamino-2-phenylazo-4,5-dimethylbenzene.

2. A process for the preparation of 1-N-tetraacetyl-d-ribitylamino-2-phenylazo-4,5-dimethylbenzene which comprises reacting an aqueous solution of a phenyl diazonium salt with tetraacetyl-4,5-dimethylphenyl-d-ribamine in a predominant proportion of a solvent selected from the group consisting of glacial acetic acid and dioxan, said solvent being so adjusted as to be only mildly acid.

3. A process for the preparation of 1-N-tetraacetyl-d-ribitylamino-2-phenylazo-4,5-dimethylbenzene which comprises reacting phenyl diazonium chloride with tetraacetyl-4,5-dimethylphenyl-d-ribamine in glacial acetic acid buffered with sodium acetate, precipitating the product by running into an excess of water, extracting the resulting azo dye with a water-immiscible solvent, and recovering the 1-N-tetraacetyl-d-ribitylamino-2-phenylazobenzene by evaporating the solvent.

4. In the process for the preparation of 1-N-tetraacetyl-d-ribitylamino-2-phenylazo-4,5-dimethylbenzene, the step of reacting tetraacetyl-4,5-dimethylphenyl-d-ribamine with a phenyl diazonium salt in a predominantly non-aqueous solvent selected from the group consisting of glacial acetic acid and dioxan.

5. In the process for the preparation of 1-N-tetraacetyl-d-ribitylamino-2-phenylazo-4,5-dimethylbenzene, the step of reacting tetraacetyl-4,5-dimethylphenyl-d-ribamine with phenyl diazonium chloride in a predominantly non-aqueous solvent selected from the group consisting of glacial acetic acid and dioxan.

6. A process for the preparation of 1-N-tetraacetyl-d-ribitylamino-2-phenylazo-4,5-dimethylbenzene which comprises reacting a phenyl diazonium salt in aqueous solution with tetraacetyl-4,5-dimethylphenyl-d-ribamine in a predominant proportion of a non-aqueous solvent selected from the group consisting of glacial acetic acid and dioxan, and subsequently reducing the hydrogen ion concentration.

RICHARD PASTERNACK.
ELLIS VINCENT BROWN.

DISCLAIMER 2,332,666.—*Richard Pasternack*, Islip, and *Ellis Vincent Brown*, Cold Spring Harbor, N. Y. ACETYLATED SUGAR COMPOUND. Patent dated October 26, 1943. Disclaimer filed July 31, 1944, by the inventors; the assignee, *Chas. Pfizer & Co., Inc.*, consenting.

Hereby enter this disclaimer to claim 1 of said patent.

[*Official Gazette August 22, 1944.*]